SIGNAL CONTROL APPARATUS

Filed Aug. 14, 1961

2 Sheets-Sheet 1

INVENTOR.
WILLIAM A. STEIN
EDWARD G. BRITTAIN
BY D. Gordon Angus
ATTORNEY

INVENTOR.
WILLIAM A. STEIN
EDWARD G. BRITTAIN
BY D. Gordon Angus
ATTORNEY

United States Patent Office 3,182,227

Patented May 4, 1965

3,182,227

SIGNAL CONTROL APPARATUS

Edward G. Brittain, Covina, and William A. Stein, Arcadia, Calif., assignors to Aerojet-General Corporation, Azusa, Calif., a corporation of Ohio Filed Aug. 14, 1961, Ser. No. 131,263
5 Claims. (Cl. 317—142)

This invention relates generally to signal control apparatus and more particularly to timing or counting circuits.

Timing or counting devices heretofore developed were generally satisfactory in the environmental conditions for which they were designed, but recent technical advances, particularly in rocket and satellite programs have imposed new requirements of accuracy, reliability, and weight, which were not satisfied by those timing or counting devices previously available. In particular, it is necessary to devise counting or timing devices which can function repeatedly with a high degree of precision after being subjected to intense vibration, large temperature extremes, and varying or poorly regulated supply voltages, such as might be encountered if the timing device were mounted in a satellite.

What is needed, therefore, and comprises an important object of this invention is to provide a simple lightweight vibration resistant timing device which remains highly accurate despite wide temperature extremes or fluctuations in the supply voltages.

The invention in its broadest aspect comprises the use of a unijunction transistor as a switching element. A capacitor is connected to the emitter terminal and a regulated supply voltage is connected to the base-2 terminal of the transistor. Voltage dropping resistances, some of which are temperature compensated, are connected between the base-2 terminal and the emitter terminal of the transistor to cause the capacitor to charge at a predetermined rate. As the capacitor charges, the potential on the emitter terminal increases until the transistor suddenly becomes conductive. A relay is connected to the transistor in such a way that when the transistor becomes conductive, the relay is actuated. When this happens various contacts controlled by the relay open and close. These contacts bypass the transistor and make the operation of the relay independent of the conductivity of the transistor. In addition, they cut off power to the transistor and operate various control contact switches. Finally, they short out the capacitor in order to completely discharge it so that if the device is used repeatedly, or recycled rapidly, the time required for the capacitor to charge high enough to cause the transistor to again become conductive will be constant to within a high degree of accuracy.

This and other objects of this invention will become more apparent when understood in the light of the accompanying drawings and specifications wherein.

Figure 1:
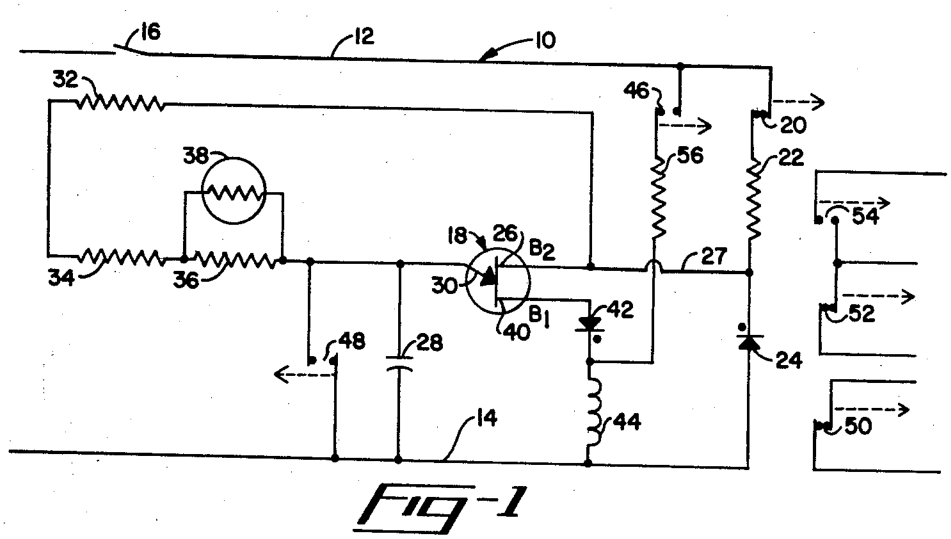
FIG. 1 is the circuit of a solid state timer embodying the principles of this invention.

Referring now to FIG. 1 of the drawing, a timing circuit indicated generally by the reference numeral 10 comprises a pair of power input leads 12 and 14. Power lead 12 is preferably provided with a control switch 16 for controlling the operation of the circuit.

The circuit includes a unijunction transistor 18 which functions as a gate or electronic switch for the timing circuit. Power leads 12 and 14 connect through a pair of normally closed relay-operated contacts 20, a voltage dropping resistor 22 and a zener diode 24, all in series. The base-2 terminal 26 of the unijunction transistor 18 is connected between the voltage dropping resistor 22 and the zener diode 24.

This arrangement establishes a reference or bias potential on the base-2 terminal 26 of the unijunction transistor which is stable over a wide range of input voltages applied to the power leads 12 and 14. As will become apparent below, this voltage compensating feature can be important if the timer where installed in a satellite where fluctuations in the supply voltage cannot be corrected.

A capacitor 28 is connected between the emitter terminal 30 of the unijunction transistor 18 and power lead 14. Resistances 32, 34, and 36 are connected in series between base-2 terminal 26 and the common connection point of the emitter terminal 30 of the unijunction transistor 18 and the capacitor 28. This arrangement establishes a charging potential on the capacitor 28, and the rate at which the capacitor is charged is determined primarily by the magnitude of resistance 32 and the capacitance of the caapcitor 28. A thermistor 38 is in parallel with resistance 36 to compensate the timer for increased leakage through the capacitor 28 and variations in the behavior of the unijunction transistor 18 due to temperature changes. In the event thermistor 38 shorts out, the additional resistance 36 is provided to protect unijunction transistor 18 from excessive current. The base-1 terminal 40 of the unijunction transistor 18 is connected to power lead 14 through a diode rectifier 42 and a relay coil 44.

With the arrangement described so far, when control switch 16 is closed and a voltage is applied across leads 12 and 14, the voltage applied to capacitor 28 through resistors 32, 34, and 36 causes it to charge. This accumulation of charge causes the potential of the emitter terminal 30 of the unijunction transistor to rise. At a critical potential level, determined by the characteristics of the unijunction transistor and the response of capacitor 28, the transistor suddenly becomes conductive. When this happens, the electrical energy stored in capacitor 28 discharges through the unijunction transistor 18 and through the diode rectifier 42 and the relay coil 44. This energizes the relay coil momentarily and actuates all the contacts controlled by it.

Relay coil 44, in this particular embodiment, may control a large number of electrical contacts. These include contacts 20, 46, and 48, which play an important part in the timing circuit. In addition, relay 44 may control other electrical contacts such as 50, 52, and 54, which may be in electrical circuits isolated from the timing circuit.

When relay 44 is actuated, contacts 20 open, contacts 46 close and contacts 48 close as indicated by the dotted arrows associated with them. When contacts 20 open, power to the unijunction transistor is cut off. When contacts 46 close, a connection is made through a current limiting resistor 56 to the relay coil 44 bypassing unijunction transistor 18 so that the relay coil 44 will remain energized even though the unijunction transistor has become nonconductive. When contacts 48 close, the capacitor 28 is completely discharged. This is an important feature because it effectually erases memory in the capacitor for rapid reset so that if the timing circuit is immediately used again, the time delay required for the unijunction transistor to again become conductive will be constant within a high degree of accuracy. In this respect diode 42 prevents back biasing of the unijunction transistor at the completion of the timing operation.

The unijunction transistor is a light weight reliable vibration resistant solid state element, and by incorporating it in the circuit shown in FIG. 1, the resulting timing circuit will be highly accurate despite fluctuations in the voltage supply and temperature changes.

Considering the circuit shown in FIG. 1 from another point of view, the accumulation of electric charge in capacitor 28 causes the potential of the emitter terminal to rise until at a critical voltage the unijunction transistor suddenly becomes conductive. Although a resistance-capacitance network is an effective way to provide the desired time delay, other accumulating devices could be used. For example, by properly selecting resistance 32, the passage of current therethrough could cause its temperature to increase with time. The temperature would continue to rise until after a predetermined period, a bimetallic strip associated with the resistance would move in such a way as to cause the unijunction transistor to become conductive. Similarly, the current flow from the base-2 terminal 26 to the emitter terminal 30 of the unijunction transistor 18 could cause an increasing magnetic effect in a magnetizable material. This material would be associated with the unijunction transistor in such a way that when the magnetization of the magnetizable material reached a certain level, it would cause the unijunction transistor to become conductive. As seen, circuit 10 can be used with an accumulator which responds to any kind of a physical input, such as a current, voltage, temperature change, or even radiation. For example, if a detecting device which responds to radiation by producing an output voltage which increases with the total radiation received were substituted for capacitor 28, the above-described circuit, although primarily designed as a timing circuit could be used as a simple, highly accurate particle or radiation counter.

Relay coil 44 in the timing circuit 10 described in FIG. 1 is actuated by the discharge of electrical energy in capacitance 28 through the unijunction transistor 18. This imposes restrictions on the size and sensitivity of the relay coil 44 because the energy required to actuate the relay coil can never be greater than the energy available in the capacitance 28. It would be desirable to use the basic timing circuit disclosed in FIG. 1 with relay coils regardless of their size or sensitivity without redesigning the circuit by changing the capacitance of capacitor 28 and the value of resistances 32, 34, and 36.

Figure 2:
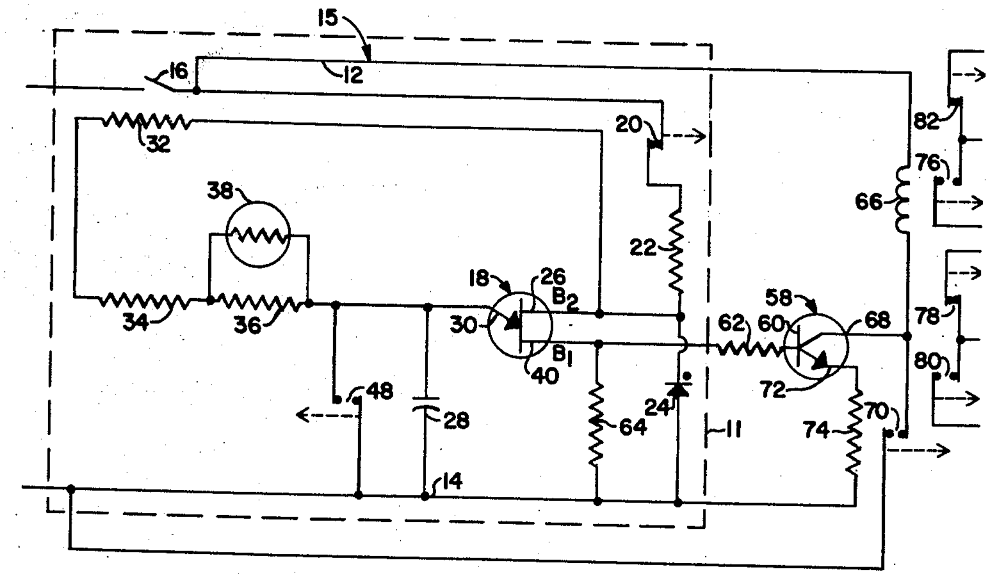
FIG. 2 is a modification of the circuit shown in FIG. 1, particularly useful where it is desirable to mate the solid state timer with an external independent relay switch.

To eliminate this necessity and to make the timing circuit useful with relays of any size or sensitivity, the modified circuit shown in FIG. 2 has been provided. This circuit is generally similar to the timing circuit shown in FIG. 1, and insofar as the elements in circuit 15 behave in the same way and perform the same function as the elements in circuit 10, they have been given the same reference numerals.

When the control switch 16 in circuit 15 is closed, a reference potential is established at the base-2 terminal 26 of the unijunction transistor 18. Resistances 32, 34, and 36 are connected between the base-2 terminal 26 and the emitter terminal 30 as described in circuit 10. A capacitor 28 is connected between the emitter terminal 30 and power line 14. When control switch 16 is closed, capacitor 28 charges, causing the potential of emitter terminal 30 to rise. When the potential of emitter 30 reaches a critical value, the unijunction transistor 18 suddenly becomes conductive.

From this point on, the circuit shown in FIG. 2 differs from that described in FIG. 1. In FIG. 2, the base terminal 60 of an amplifier transistor 58 is connected to the base-1 terminal 40 of the unijunction transistor through a biasing resistor 62. A divider resistor 64 is connected between the base-1 terminal of the unijunction transistor and power lines 14. A relay coil 66 is connected between power line 12 and the collector terminal 68 of the amplifier transistor 58. Power lines 12 and 14 are connected together through relay coil 66 and normally open relay controlled bypass contacts 70. The emitter terminal 72 of the amplifying transistor 58 is connected to power line 14 through the biasing resistor 74.

When control switch 16 is closed, charge begins to accumulate in capacitor 28, as described above. This causes the potential of the emitter terminal of the unijunction transistor to rise until the unijunction transistor suddenly becomes conductive. When this happens, the energy stored in capacitor 28 is discharged first through resistor 64 and then through resistor 62 in the amplifying transistor 58. This energizes relay 66 which controls contacts 70, 20, and 48 in the timing circuit. In addition, relay 66 controls contacts 76, 78, 80, and 82 in circuits isolated from the timing circuit. When relay 66 is actuated, the contacts move in the direction indicated by dotted arrows. Consequently, contacts 20 open, cutting off power to the unijunction transistor 18. Contacts 48 close, completely discharging capacitor 28 for rapid reset, and bypass contacts 70 close so that the relay 66 remains energized independently of the unijunction transistor 18 and the amplifying transistor 58. The remaining contacts 76, 78, 80, and 82 in isolated circuits move in the directions indicated by dotted arrows. With this arrangement, the timing circuit can be enclosed in a box 11, indicated generally by a dotted rectangle, and the basic timer can be used with relays having any desired sensitivity or energy requirements by proper selection of the relay coil 66 and amplifying transistor 58, as shown in FIG. 2.

The principles of this invention as described in the circuits shown in FIGS. 1 and 2, have all been applied to timing circuits, and as described above, they are also applicable to various types of counting circuits. In addition, however, the principles of this invention can also be applied to a solid state pulse generator having means for varying both the repetition rate and the pulse width. In particular, circuit 45 shown in FIG. 3 discloses how the basic solid state timing circuit has been converted to a pulse generator with variable parameters. Circuit elements which perform the same function and are connected in the same way as those described in circuits 10 and 15 have been given the same reference numerals.

Figure 3:
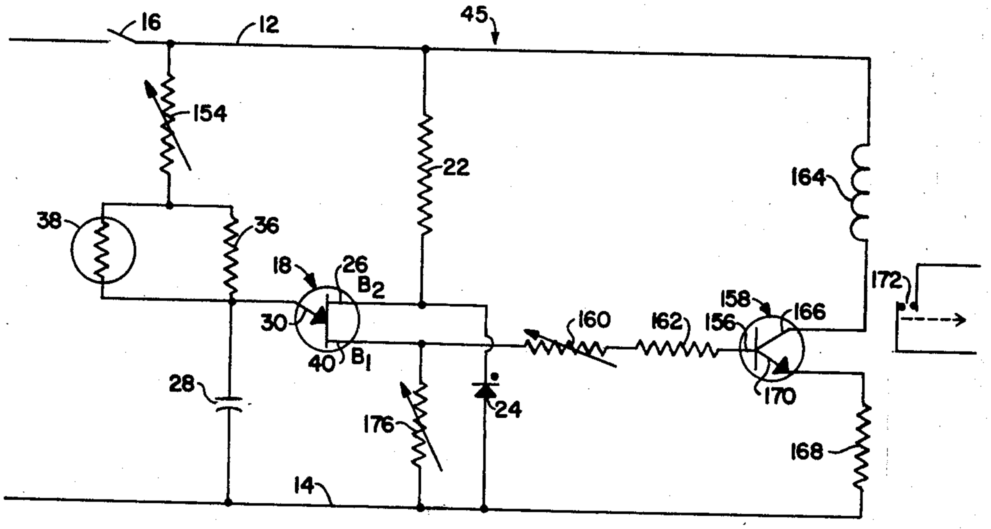
FIG. 3 discloses a circuit for a variable repetition rate and variable pulse width pulse generator embodying the principles of this invention.

Referring for the moment, to circuit 10 shown in FIG. 1, the combination of resistance 32 and capacitor 28 substantially determines the period of time required for the potential on the emitter terminal 30 of the unijunction transistor 18 to rise to the critical value where the unijunction transistor 18 becomes conductive. If either the magnitude of the resistance 32 or the magnitude of the capacitance of capacitor 28 is changed, this basic time will also change. In FIG. 3 variable resistance 154 corresponds generally to the fixed resistance 32 in FIG. 1. However, by changing the adjustment of the variable resistance, the time required for capacitance 28 to charge to the critical value and cause unijunction transistor 18 to become conductive, can be altered as desired.

In circuit 45, shown in FIG. 3, the terminal base-1 40 of unijunction transistor 18 is connected to base 156 of an output transistor 158 through a variable resistor 160 and a protective resistor 162 which protects the transistor 158 in the event the variable resistor 160 becomes shorted. A relay coil 164 is connected between power line 12 and the collector terminal 166 of output transistor 158. A current limiting resistor 168 is connected between the emitter terminal 170 and power line 14. Normally open contacts 172 are actuated by relay coil 164.

A fine control variable resistor 176 is connected between the base-1 terminal of the unijunction transistor 18 and the power line 14.

With this arrangement, when control switch 16 is closed, the charge on capacitor 28 begins to accumulate causing the potential on the emitter terminal 30 to increase until the unijunction transistor suddenly becomes conductive. When this happens, the energy in the capacitor 28 passes through the unijunction transistor 18 through the variable resistor 176 and through variable resistor 160, to output transistor 158. This causes the charge on capacitor 28 and hence the potential on the emitter terminal 30 of the unijunction transistor 18 to drop in value until the unijunction transistor becomes nonconductive. However, the time required for capacitor 28 to discharge and hence the time required for the unijunction transistor 18 to become nonconductive depends on the magnitude of the resistance of resistors 160 and 162 and on the magnitude of the resistance of the variable resistor 176.

When the unijunction transistor 18 is conductive the output transistor 158 energizes the relay coil 164 causing contacts 172 to close. When the unijunction transistor becomes non-conductive the relay reverts to its initial condition. Hence, these contacts remain closed only while the unijunction transistor 18 is conductive, and this period depends on the setting of the variable resistors 160 and 176. Consequently, the width of the voltage pulses passing through contacts 172 can be varied by adjusting both the coarse adjustment variable resistor 160 or the fine adjustment variable resistor 176.

After the energy or response of capacitor 28 has decreased to a predetermined value, the unijunction transistor 18 becomes nonconductive and the capacitor begins to charge again at a rate dependent on the setting of the variable resistor 154. Hence, it can be seen that the adjustment of variable resistor 154 determines the frequency of the pulses and the adjustments of resistors 160 and 176 determine the duration or width of the pulses.

It is to be understood that the form of the invention herewith shown and described is to be taken as a preferred example of the same, and that various changes in the shape, size, and arrangement of the parts may be resorted to without departing from the spirit of this invention or the scope of the claims.

We claim:

1. A switching device, comprising:
- a unijunction transistor having an emitter, a base-1 and a base-2;
- means connected to the base-2 for establishing it at a reference potential;
- an electric charge accumulator connected to the emitter of the unijunction transistor;
- means interconnecting the base-2 and emitter for storing charge in the accumulator whereby the unijunction transistor is placed in a conductive state when the charge stored in the accumulator reaches a certain predetermined level;
- a reset device operatively related to the transistor and accumulator for momentarily effecting full discharge of the accumulator on the transistor being in a conductive state, whereby a cyclic occurrence of conductive states of the transistor is achieved of substantially constant frequency;
- an amplifier fed by signals from base-1 of the unijunction transistor generated when the transistor is conductive; and
- a relay driven by the amplifier.

2. The switching device as in claim 1 in which the amplifier includes a second transistor interconnecting the relay and a source of electrical power whereby the relay is energized when the second transistor is made conductive.

3. A timing device of the class described comprising in combination a pair of power input leads, a first connection means between said power leads comprising first normally closed contacts, a voltage dropping resistor and a zener diode in series, a unijunction transistor, an electrical connection between a terminal of the zener diode and the base-2 terminal of the unijunction transistor to establish a reference potential thereon that is stable over a wide range of voltages on said power input leads, a capacitor connected between the emitter terminal of said unijunction transistor and one of said power input leads, voltage dropping resistances connected between the base-2 terminal of the unijunction transistor and the said emitter terminal and one terminal of the capacitor, at least certain of said resistances being temperature compensated so that the operation of the unijunction transistor will be stable over a wide range of temperatures, a short circuiting line with second normally open contacts therein connected in parallel with said capacitor whereby when said contacts are closed said capacitor is shorted out and is completely discharged, and when said contacts are open, the voltage between said emitter terminal and said one of the power input leads established by the connection of said voltage dropping resistances between the base-2 terminal and said emitter terminal causes the capacitor to charge and the potential of said emitter terminal to increase at a rate dependent on the capacitance and the magnitude of the said voltage dropping resistances until after a predetermined period of time the voltage on the emitter terminal rises enough to cause the unijunction transistor to become conductive, a rectifying diode and a relay connected in series between the base-1 terminal of said unijunction transistor and said one of said power leads so that when said unijunction transistor becomes conductive said relay is actuated and when power to the relay is cut off the rectifying diode prevents back biasing of the unijunction transistor, and a holding circuit connection between one of the power input leads and a terminal of the relay coil, said holding circuit connection including third normally open contacts and a current limiting resistor, said first, second, and third contacts controlled by said relay whereby when said relay is actuated, said first contact opens to cut off the power to the unijunction transistor, said second contacts close to short out said capacitor and discharge it completely, and said third contacts close to bypass said unijunction transistor in order to keep said relay energized until the power in said input leads is cut off.

4. A device of the class described comprising in combination a pair of power leads, a first connection means between said leads comprising a voltage dropping resistor and a zener diode in series, a unijunction transistor, an electrical connection between a terminal of said zener diode and base-2 of the unijunction transistor to establish a reference potential thereon which is stable over a wide range of voltages applied to said power leads, a capacitor connected between the emitter terminal of said unijunction transistor and one of said power leads, first control means for applying a voltage to said capacitor to cause it to charge at a controlled rate and thereby cause the potential of the emitter terminal of the unijunction transistor to increase, at least a part of said first control means being temperature compensated so that the charging rate of said capacitance is relatively unaffected by temperature changes, the connection between said capacitor and the emitter terminal of said unijunction transistor being such that when the potential on said emitter terminal increases to a predetermined level, the unijunction transistor becomes conductive, a transistor amplifier and an electric unit controlled thereby, the base-1 terminal of said unijunction transistor connected to said transistor amplifier in such a way that when said unijunction transistor becomes conductive the electric unit is actuated and the capacitor being to discharge through the transistor amplifier, second control means connected between the base-1 terminal of said unijunction transistor and said transistor amplifier to control the discharge rate of said capacitor whereby when the charge on said capacitor and hence the voltage on the emitter terminal of said unijunction transistor falls below a predetermined level, said unijunction transistor becomes nonconductive and said electric unit reverts to its initial condition, whereupon the capacitor begins to charge again for another cycle, so that adjustments in said first control means controls the frequency of actuation of said electric unit and adjustments in said second control means controls the duration of time the electric unit is actuated.

5. The device described in claim 4 wherein said electric unit comprises a relay for operating contacts arranged in an electrical circuit whereby each actuation of the relay produces an electric signal pulse and the frequency and duration of the pulses are controllable by adjustments of the first and second means.

References Cited by the Examiner

UNITED STATES PATENTS

| | | | |
|---|---|---|---|
| 2,567,928 | 9/51 | Farmer | 317—142 |
| 2,867,754 | 1/59 | O'Bleness. | |
| 2,927,259 | 3/60 | Neal. | |
| 2,949,545 | 8/60 | White. | |
| 3,019,356 | 1/62 | Tepolt et al. | 307—132 |
| 3,026,485 | 3/62 | Suran. | |
| 3,045,150 | 7/62 | Mann | 317—148.5 |
| 3,060,331 | 10/62 | Habisohn. | |
| 3,091,729 | 5/63 | Schmidt. | |
| 3,113,241 | 12/63 | Yonushka. | |
| 3,124,722 | 3/64 | Steiner. | |
| 3,125,707 | 3/64 | Culbertson | 317—142 |

OTHER REFERENCES

Szmanz and Bakes: "Transistor Time Delay for Industrial Control," Electronics, September 25, 1959, pp. 74, 75.

SAMUEL BERNSTEIN, *Primary Examiner.*

LLOYD McCOLLUM, *Examiner.*